United States Patent [11] 3,576,401

[72] Inventor Bruce Ronald Saxon
Harrisburg, Pa.
[21] Appl. No. 708,237
[22] Filed Feb. 26, 1968
[45] Patented Apr. 27, 1971
[73] Assignee International Telephone and Telegraph Corporation
New York, N.Y.

[54] BRIDGING UNITS FOR TERMINATING LEASED LINES IN TELEPHONE LINE CIRCUITS
3 Claims, 1 Drawing Fig.

[52] U.S. Cl. .......... 179/18, 179/1
[51] Int. Cl. .......... H04m 11/00
[50] Field of Search .......... 179/1.4, 1 (HFT), 1 (C), 18.04, 37

[56] References Cited
UNITED STATES PATENTS

| | | | |
|---|---|---|---|
| 2,071,053 | 2/1937 | Varley | 179/37 |
| 3,100,244 | 8/1963 | King et al. | 179/1 |
| 3,126,448 | 3/1964 | Millett | 179/1 |
| 3,283,075 | 11/1966 | Moore | 179/1 |
| 3,283,076 | 11/1966 | Moore | 179/1 |
| 3,296,372 | 1/1967 | Moore | 179/1 |
| 3,321,580 | 5/1967 | Horne et al. | 179/1 |

*Primary Examiner*—William C. Cooper
*Assistant Examiner*—David L. Stewart
*Attorneys*—C. Cornell Remsen, Jr., Rayson P. Morris, Percy P. Lantzy, J. Warren Whitesel and Delbert P. Warner

ABSTRACT: Public address type paging equipment is used in connection with a telephone, such equipment being connected into a conventional telephone system via leased lines. To page a subscriber at a distant location, a local subscriber sends a momentary burst of tone over the leased line. Equipment at the distant end of the line responds by connecting the line to paging equipment for a period of time which is long enough to complete an average page, whereupon a private telephone conversation may be commenced between the local subscriber and the paged party.

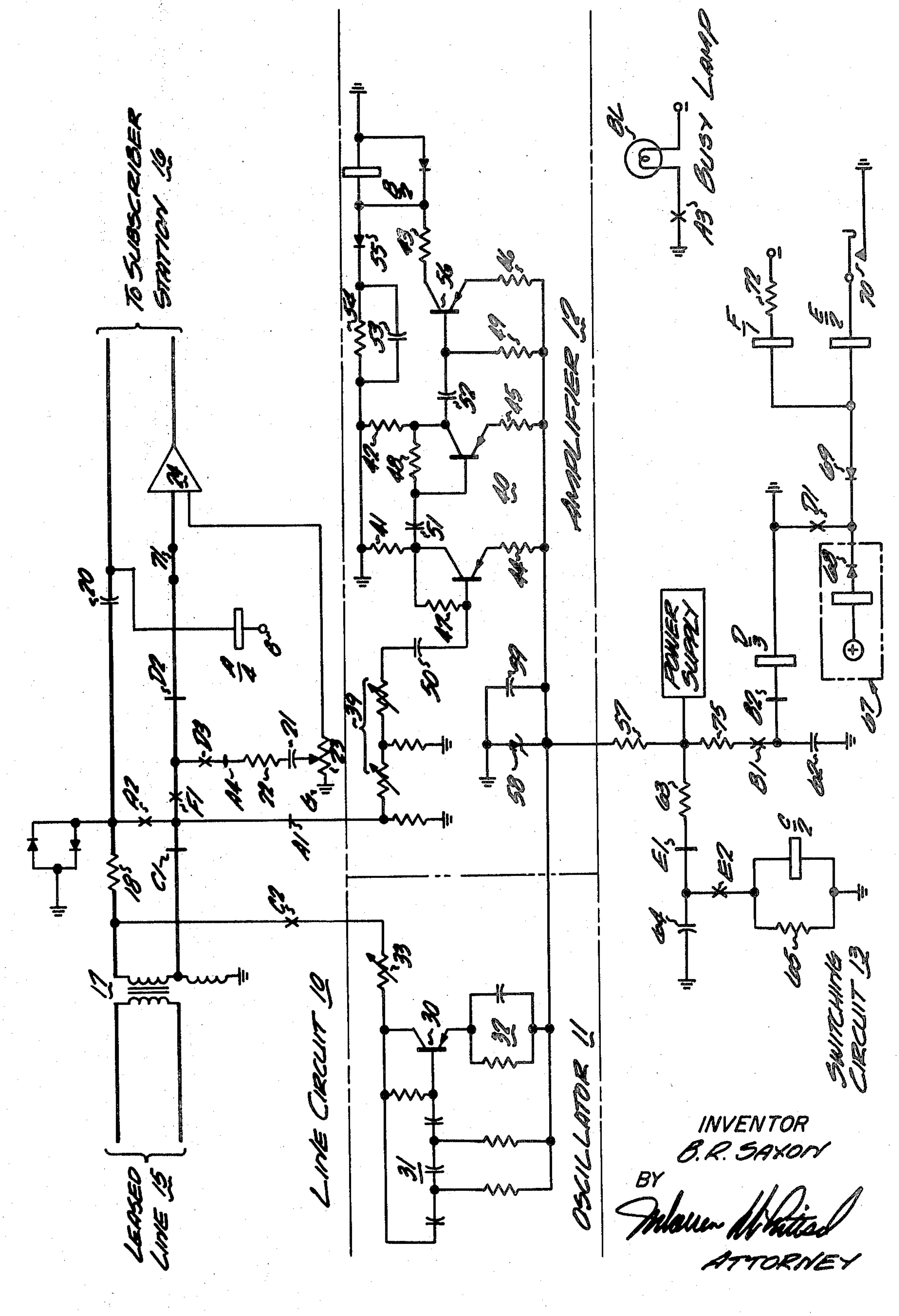
INVENTOR
B. R. SAXON
BY
ATTORNEY

BRIDGING UNITS FOR TERMINATING LEASED LINES IN TELEPHONE LINE CIRCUITS

This invention relates to telephone line circuits and more particularly to bridging units for terminating leased lines.

Conventionally, telephone operating companies own the subscriber lines and all of the equipment coupled thereto. Sometimes, however, a subscriber may have other equipment which may be coupled to the ends of the lines, in which case the subscriber merely leases a telephone line to be connected to such equipment. Certain public address and intercommunication equipment is exemplary of the devices which may be so used with leased lines.

When the subscriber's own equipment is connected to the end of a leased line, there may be a compatibility problem unless some interfacing means is provided for either insuring or restoring compatibility. Generally, a leased line is merely a pair of wires which extend from a subscriber's location to a central office where they are jumper connected directly to another pair of wires extending to another subscriber location. Frequently lines do not connect to central office equipment, but control equipment of some kind must then be connected to the line. Quite often, the leased lines do have access to the central office equipment.

While the interfacing problems may take any of many different forms, it may be well to here list a few, by way of example. First, the electrical characteristics of the line and equipment may be different, such as: line impedance, sensitivity, selectivity, and the like. These characteristics must be matched to avoid distortions, noise, and other similar problems. Second, in circumstances where the line is connected to the central office equipment there are the system logic problems, as where central office equipment interprets open and closed loops as on-hook and off-hook conditions and direction of current as supervision signals. Third, there are the signaling problems, such as dial pulsing, where the control signals must be in the required "machine language." Conversely stated, the signals from the interfacing equipment may not cause cable noise which simulates the usual telephone system control signals to the extent that they cause unwanted results in a central office. Those skilled in the art will readily perceive still other interfacing problems.

Accordingly, an object of the invention is to provide new and improved interfacing equipment for terminating leased telephone lines. In this connection, an object is to improve operating characteristics, reduce transmission losses and be compatible with AC coupled lines (e.g. microwave terminations). Also, an object is to remotely control equipment via leased telephone lines without allowing such control to interfere with the normal operation of central office telephone equipment. More particularly, an object is to control remote paging and public address equipment without requiring DC paths.

In accordance with one aspect of this invention, these and other objects are accomplished by means of a tone actuated bridging unit. The tone used to actuate the bridging unit is applied momentarily, and it produces a result which lasts throughout a period of time which is long enough to complete the average paging announcement. Then, the paging period automatically terminates. During the interval while the tone is on the line, the leased line is disconnected from a telephone or other voice set and connected instead to a tone detection circuit. The electrical conditions are controlled so that the central offices does not react in any unfavorable manner to the transfer of the leased line to the amplifier.

The above-mentioned and other features of this invention and the manner of obtaining them will become more apparent, and the invention itself will be best understood by reference to the following description of an embodiment of the invention taken in conjunction with the accompanying drawings, in which the single sheet of drawing is a schematic circuit diagram which shows a tone actuated bridging unit incorporating the principles of the invention.

The drawing is divided by dot-dashed lines into the following major subcircuit units: a line circuit 10, an oscillator 11, an amplifier 12, and a switching circuit 13.

The line circuit 10 interconnects the leased line 15 and any suitable station equipment 16. The station equipment 16 includes a conventional telephone or any voice set, such as a telephone and loudspeaker hands-free-type of device. In addition, the line circuit 10 includes a repeat coil 17 for providing DC isolation between the leased line and the interface equipment. A resistor 18 is connected to repeat coil 17 to provide a fractional tone burst signal in the handset. This is similar to a ring back signal. A line relay A gives line supervision for subscriber station 16 and functions as a high impedance choke for AC voice frequencies, talking battery being supplied from battery and ground terminals, B and G, respectively. Capacitors 20, 21 are AC couplings for voice signals. The resistors 22, 23 provide a volume control for the amplifier 24 which drives either a hands-free or a paging loudspeaker.

The oscillator circuit 11 provides a momentary tone signal which may be sent over the leased line to control equipment (not shown) at the distant end of the line which is identical to that shown in the drawing. The active oscillator component is a PNP transistor 30 coupled to the line circuit in a common emitter configuration. The network 31 is an RC phase circuit which provides the necessary feedback to sustain oscillations. The emitter bias is supplied through a conventional circuit 32 with an AC bypass capacitor. The potentiometer 33 provides an amplitude adjustment.

The amplifier 12 is coupled to line circuit 10 via a coarse adjustment and fine adjustment gain control potentiometer circuit 39. The amplifier 12 includes three cascaded transistor stages 40, each transistor being a PNP device used in a common emitter configuration. All three transistors amplify; the last stage also serves as a relay driver. Resistors 41—43 are collector loads, and resistors 44—46 provide emitter bias. Resistors 47—49 provide base bias and negative feedback stabilization. Capacitors 50—52 provide interstage AC coupling. Capacitor 53 provides a delay function, and parallel resistor 54 provides a discharge path.

The diode 55 helps control the circuit response time. That is, when transistor 56 turns on, capacitor 53 charges over a circuit traced from the POWER SUPPLY through resistors 57,46, transistor 56, resistor 43, the diode 55, and capacitor 53 to ground. When transistor 56 turns off, the charge on capacitor 53 is isolated by diode 55 to speed turnoff time of relay B.

Relay B is a master control or keying relay for accomplishing the desired function of keying in the paging amplifier. An unnumbered diode is used to provide spark protection when the inductive field of relay B collapses.

The Zener diode 58 regulates the POWER SUPPLY voltage in the usual manner, known to those skilled in the art. Capacitor 59 is an AC bypass to ground. The resistor 57 serves as a coupling and current limiting device between the POWER SUPPLY and the amplifier 12 and oscillator 11.

Capacitor 62 is an energy storage circuit for timing the interval during which a called subscriber may be paged locally. Resistor 63 and capacitor 64 form another RC circuit for measuring the period while tone is sent to the distant end of line 15. Relay C is a keying relay operated during the time interval measured by RC circuit 63,64. Resistor 65 helps discharge the inductive field of the winding C to provide a timing adjustment. Relay D is a keying circuit operated during the time interval measured by RC circuit 62.

Any suitable device 67 may be provided for giving an auxiliary service or function when paging occurs. Shown here, by way of example, is a relay having contacts (not shown) for controlling the auxiliary function. For example, these contacts could turn off a noisy motor or connect in a parallel loudspeaker during paging. The relay in device 67 operates over a circuit extending from positive battery through diode 68 when contacts D1 close a circuit to ground.

The diode 69 isolates circuit 67 from two relays E and F and a key 70. The key 70 provides a manual control for causing tone to be sent to the distant paging equipment and for connecting in a local paging loudspeaker. If local paging is not desired, the wire 71 is cut.

The remainder of the components are primarily relay contacts which will be understood best from a description of how the circuit operates.

First, assume the case where a subscriber at the distant end of the leased line 15 wants to control the local equipment for paging a subscriber in the vicinity of the station 16. That subscriber at the distant end pushes a button (similar to pushbutton 70) and sends a tone burst over line 15 and through the repeat coil 17. The tone passes through resting break contacts C1, A1, gain control circuit 39, and capacitor 50 to amplifier 40. Because of the adjustment of voltage gain by circuit 39, and the tone burst amplitude, transistor 56 conducts, and relay B operates over the circuit extending from ground through the winding of relay B, resistor 43, transistor 56, resistors 46 and 57 to the POWER SUPPLY. Responsive thereto, the break contacts B1 close to connect capacitor 62 through resistor 75 to the POWER SUPPLY. Contacts B2 open to isolate the capacitor 62 from the other circuits.

The tone sent over line 15 ends after a brief moment. The transistor 56 turns off, and relay B releases. The charge on capacitor 53 cannot pass through the diode 55 to delay the release time of the relay B. Contacts B1 open to break the charging path to the capacitor 62. Contacts B2 close to connect the charged capacitor 62 to relay D, which operates during the interval while the capacitor discharges, such interval being long enough for the average paging announcement. During this interval, contacts D1 close a circuit from ground through diode 69 and relay F to battery. Thus, relays D, F operate during the interval while the capacitor 62 discharges. Contacts D2 open the normal input and contacts D3 close a paging input to amplifier 24 for changing the volume of the amplifier output during paging. A moment later, the voice path is completed to the paging amplifier when relay F operates its contacts F1, the path extending from line 15 through repeat coil 17, contacts C1, F1, D3, A4, resistor 22, capacitor 21, and resistor 23 to an input of amplifier 24. While the volume is thus adjusted, the person at the distant end of line 15 may page any one through the loudspeaker at or near the station 16.

After capacitor 62 discharges sufficiently, relay D releases, and contacts D1 open to release relay F. Contacts D3 open and D2 close to return the amplifier 24 inputs to normal.

If the paged subscriber answers, any suitable means (such as the well-known hook-switch contacts) close the line loop. Relay A operates from battery B over the loop (not shown) to the subscriber station and return to ground G. Contacts A1 open to disconnect amplifier 12 from the line since a detection of the momentary tone will not be required—hangs up and, in fact, must not be detected—during conversation. Contact A2 close to connect the handset in a normal conversation mode, which is from ground through part of the right-hand winding of repeat coil 17, contacts C1 and A2, and capacitor 20 to the subscriber station. The telephone may both send and receive through the capacitor 20. Contacts A3 close to light a busy light BL, and contacts A4 open the signal path to the input of the paging amplifier 24. This way the remote paging input is cut off and conversation may begin immediately regardless of whether the timing period has or has not ended. Furthermore, since the tone detector is removed from the line, there are no voice immunity problems.

Conversation may follow. Thereafter, the local subscriber hangs-up to break the local loop and release the relay A and return the circuit to normal.

Next, assume the case where the local subscriber wishes to page equipment connected to line 15 at the remote end or local equipment connected to his line directly. The subscriber picks up his telephone and pushes button 70. Relay A operates over the loop. Relays E and F operate in series to the battery connected to the resistor 72.

Responsive to the operation of relay A, contacts A1 open to disconnect the amplifier 12 from the line. Contacts A2 close to connect the telephone to the amplifier 24 for local paging. Contacts A3 close to light the busy lamp BL. Contacts A4 close to paging from a remote location over line 15.

Relay E opens contacts E1 while closing contacts E2 to connect the charged capacitor 64 to relay C which operates during the interval while the capacitor discharges.

Relay F closes contacts F1, connecting voice signal to the amplifier.

Relay C opens contacts C1 to disconnect the amplifier 24 from the repeat coil 17. Contacts C2 close to connect the oscillator 11 to the repeat coil 17.

Tone is sent from the oscillator 11 through contacts C2, and repeat coil 17 to the leased line 15. After a moment, the capacitor 64 is sufficiently discharged, and relay C releases. Contacts C2 open to terminate the tone. Contacts C1 close to reconnect the amplifier 24 to the repeat coil 17.

The equipment at the distant end of the line 15 reacts to the receipt of this tone in the described manner. For a timed period, the local subscriber station is connected to a paging amplifier at the distant end of line 15. During this period, the subscriber has enough time to make a typical paging announcement. Then his station is automatically disconnected from the paging amplifier. If a called subscriber answers before the end of that time period, contacts (such as A4) open at the distant end to cause a disconnection of the paging amplifier at once.

While the principles of the invention have been described above in connection with specific apparatus and applications, it is to be understood that this description is made only by way of example and not as a limitation on the scope of the invention.

I claim:

1. In a telephone network, a telephone line connected to said network, bridging apparatus connected to said line, station equipment connected to said bridging apparatus and actuatable through said apparatus, an amplifier connected between said station equipment and said bridging apparatus said bridging apparatus comprising: means responsive to a single tone burst of limited duration received over said line from said network for enabling said amplifier for the transmission of signals from said telephone line to said station equipment, means for maintaining said amplifier enabled during a timing sequence following cessation of said tone burst, and means responsive to a circuit closure at said station equipment for disabling said amplifier, further means responsive to said circuit closure for establishing a voice transmission path from said station equipment to said line independently of said timing sequence.

2. A bridging apparatus as claimed in claim 1, from said station equipment further comprising an oscillator, means responsive to initiation of a signal for connecting said oscillator to the telephone line to transmit a burst of tone thereover, means responsive to said signal initiation for disabling said amplifier from transmission to said station equipment, and means responsive to the initiation of said signal for terminating the transmission of a tone burst after a timed period.

3. A bridging apparatus as claimed in claim 1, further comprising means responsive to the end of said timing sequence for automatically disabling said amplifier to disable the transmission of signals to the subscriber station.